(12) United States Patent
Chi et al.

(10) Patent No.: US 11,130,887 B2
(45) Date of Patent: Sep. 28, 2021

(54) PRESSURE-SENSITIVE ADHESIVE COMPOSITION

(71) Applicant: LG Chem, Ltd., Seoul (KR)

(72) Inventors: Han Na Chi, Daejeon (KR); Sung Soo Yoon, Daejeon (KR); Kee Young Kim, Daejeon (KR); Sang Hyun Hong, Daejeon (KR); Su Jee Kwon, Daejeon (KR)

(73) Assignee: LG Chem, Ltd.

( * ) Notice: Subject to any disclaimer, the term of this patent is extended or adjusted under 35 U.S.C. 154(b) by 73 days.

(21) Appl. No.: 15/762,297

(22) PCT Filed: Dec. 9, 2016

(86) PCT No.: PCT/KR2016/014478
§ 371 (c)(1),
(2) Date: Mar. 22, 2018

(87) PCT Pub. No.: WO2017/099537
PCT Pub. Date: Jun. 15, 2017

(65) Prior Publication Data
US 2018/0282589 A1    Oct. 4, 2018

(30) Foreign Application Priority Data
Dec. 10, 2015 (KR) ................. 10-2015-0176126

(51) Int. Cl.
*C09J 7/38* (2018.01)
*C09J 133/10* (2006.01)
(Continued)

(52) U.S. Cl.
CPC ........... *C09J 7/387* (2018.01); *C08F 293/005* (2013.01); *C09J 7/20* (2018.01); *C09J 133/10* (2013.01);
(Continued)

(58) Field of Classification Search
None
See application file for complete search history.

(56) References Cited

U.S. PATENT DOCUMENTS 6,663,978 B1 * 12/2003 Olson .................. C08F 220/18
428/523
2006/0024521 A1 2/2006 Everaerts et al.
(Continued)

FOREIGN PATENT DOCUMENTS

CN    101547989 A    9/2009
EP    2947129 A1    11/2015
(Continued)

OTHER PUBLICATIONS

Chinese Search Report for Application No. 201680059765 dated Apr. 23, 2019.
(Continued)

*Primary Examiner* — Ramsey Zacharia
(74) *Attorney, Agent, or Firm* — Lerner, David, Littenberg, Krumholz & Mentlik, LLP

(57) ABSTRACT

The present application relates to a pressure-sensitive adhesive composition, an optical laminate, a pressure-sensitive adhesive polarizing plate and a display device. In the present application, a pressure-sensitive adhesive composition having all excellent physical properties such as endurance reliability and interface adhesiveness and being capable of minimizing light leakage occurring under high temperature or high-temperature and humidity conditions can be provided. The pressure-sensitive adhesive composition of the present application can be used for an optical film such as a protective film and a polarizing plate.

11 Claims, 2 Drawing Sheets

(51) Int. Cl.
*C09J 153/00* (2006.01)
*G02F 1/1337* (2006.01)
*G02B 5/30* (2006.01)
*C08F 293/00* (2006.01)
*C09J 7/20* (2018.01)
*C09J 171/02* (2006.01)

(52) U.S. Cl.
CPC ........... *C09J 153/00* (2013.01); *C09J 171/02* (2013.01); *G02B 5/30* (2013.01); *G02F 1/1337* (2013.01); *G02F 2202/28* (2013.01)

(56) References Cited

U.S. PATENT DOCUMENTS

| | | | |
|---|---|---|---|
| 2009/0270557 A1 | 10/2009 | Tomita et al. | |
| 2010/0075132 A1 | 3/2010 | Waid et al. | |
| 2014/0066539 A1* | 3/2014 | Tobing | C09J 153/00 522/46 |
| 2014/0242303 A1* | 8/2014 | Lee | C08F 293/005 428/1.55 |

FOREIGN PATENT DOCUMENTS

| | | |
|---|---|---|
| JP | 2612077 B2 | 5/1997 |
| JP | 3997270 B2 | 10/2007 |
| JP | 3997271 B2 | 10/2007 |
| JP | 201168800 A | 4/2011 |
| JP | 5478900 B2 | 4/2014 |
| JP | 2014114334 A | 6/2014 |
| KR | 20070040803 A | 4/2007 |
| KR | 101023839 B1 | 3/2011 |
| KR | 20110131173 A | 12/2011 |
| KR | 101171976 B1 | 8/2012 |
| KR | 101171977 B1 | 8/2012 |

OTHER PUBLICATIONS

Search report from International Application No. PCT/KR2016/014478, dated Mar. 15, 2017.

Extended European Search Report including Written Opinion for Application No. EP16873402.8 dated Jun. 6, 2018.

* cited by examiner

PRESSURE-SENSITIVE ADHESIVE COMPOSITION

CROSS-REFERENCE TO RELATED APPLICATIONS

The present application is a national phase entry under 35 U.S.C. § 371 of International Application No. PCT/KR2016/014478 filed Dec. 9, 2016, which claims priority from Korean Patent Application No. 10-2015-0176126 filed on Dec. 10, 2015, the disclosures of which are incorporated herein by reference.

TECHNICAL FIELD

The present application relates to a pressure-sensitive adhesive composition, an optical laminate, a polarizing plate and a display device

BACKGROUND ART

Technical Field

A liquid crystal display device (hereinafter, referred to as "LCD device") typically comprises a liquid crystal panel containing a liquid crystal component injected between two transparent substrates, and an optical film. The optical film includes a polarizing film, a retardation film, a luminance enhancement film, or the like, where in many cases, a pressure-sensitive adhesive for an optical film is used in order to laminate such optical films therebetween or attach the optical films to an adherend such as a liquid crystal panel. The pressure-sensitive adhesive includes those using an acrylic polymer, a rubber, a urethane resin, a silicone resin or an ethylene vinyl acetate (EVA) resin, and the like, and as the pressure-sensitive adhesive for an optical film, particularly, a polarizing plate, the pressure-sensitive adhesive comprising the acrylic resin with excellent transparency and excellent resistance to oxidation or yellowing is generally used.

The main physical properties required for the pressure-sensitive adhesive composition for an optical film are cohesive force, pressure-sensitive adhesive force, re-workability, low light leakage property and stress relaxation property, and the like. In Patent Document 1 (Korean Patent No. 1023839), Patent Document 2 (Korean Patent No. 1171976), and Patent Document 3 (Korean Patent No. 1171977), pressure-sensitive adhesive compositions for achieving the above physical properties have been proposed.

DISCLOSURE

Technical Problem

The present application provides a pressure-sensitive adhesive composition, an optical laminate, a polarizing plate and a display device.

Technical Solution

Figure 1:
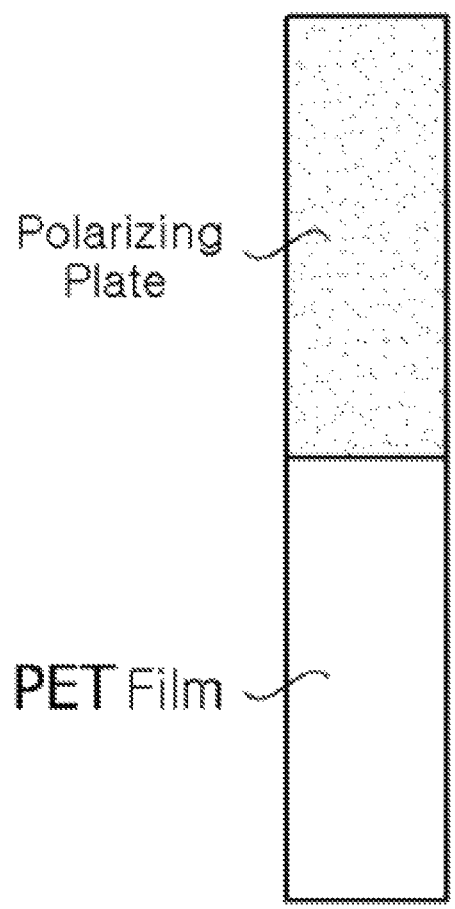
FIG. 1 illustrates a sample for interface adhesiveness evaluation.

The present application relates to a pressure-sensitive adhesive composition. An exemplary pressure-sensitive adhesive composition may comprise a block copolymer. In this specification, the term "block copolymer" may designate a copolymer comprising blocks of different polymerized monomers.

The block copolymer may comprise a first block having a glass transition temperature of 50° C. or higher and a second block having a glass transition temperature of −10° C. or lower. In this specification, the "glass transition temperature of a given block" of a block copolymer may mean a glass transition temperature measured from a polymer formed of only the monomers contained in the block.

In one example, the glass transition temperature of the first block may be 60° C. or higher, 65° C. or higher, 70° C. or higher, or 75° C. or higher. The upper limit of the glass transition temperature of the first block is not particularly limited, and may be, for example, 150° C., 140° C., 130° C. or 120° C. or so.

In one example, the glass transition temperature of the second block may be −20° C. or lower, −25° C. or lower, −30° C. or lower, −35° C. or lower, −40° C. or lower, or −45° C. or lower. The lower limit of the glass transition temperature of the second block is not particularly limited, and may be, for example, −80° C., −70° C., −60° C., or −55° C. or so.

The copolymer containing at least two types of blocks may form a fine phase separation structure in the pressure-sensitive adhesive. Such a block copolymer may exhibit appropriate cohesive force and stress relaxation property depending on the temperature change to form a pressure-sensitive adhesive that physical properties required in an optical film, such as interface adherence, endurance reliability, light leakage prevention property and re-workability, are kept excellent.

In one example, the first block in the block copolymer may have, for example, a number average molecular weight (Mn) of 2,500 to 150,000. The number average molecular weight of the first block may mean, for example, a number average molecular weight of the polymer produced by polymerizing only the monomer forming the first block. The number average molecular weight referred to in this specification can be measured, for example, by the method shown in the examples using GPC (gel permeation chromatograph). The lower limit of the number average molecular weight of the first block may be, for example, 2,500 or more, 3,000 or more, 4,000 or more, 5,000 or more, 6,000 or more, 7,000 or more, 8,000 or more, 9,000 or more, or 10,000 or more. The upper limit of the number average molecular weight of the first block may be, for example, 150,000 or less, 140,000 or less, 130,000 or less, 120,000 or less, 11,000 or less, 10,000 or less, 9,000 or less, 8,000 or less, 7,000 or less, 6,000 or less, or 5,000 or less.

In one example, the block copolymer may have a number average molecular weight of 50,000 to 300,000. The lower limit of the number average molecular weight of the block copolymer may be, for example, 50,000 or more, 60,000 or more, 70,000 or more, 80,000 or more, 90,000 or more, 100,000 or more, 110,000 or more, 120,000 or more, 130,000 or more, 140,000 or more, 150,000 or more, 170,000 or more, or 180,000 or more. The upper limit of the number average molecular weight of the block copolymer may be, for example, 300,000 or less, 280,000 or less, 260,000 or less, 240,000 or less, 220,000 or less, 200,000 or less, 190,000 or less, or 180,000 or less.

In one example, the block copolymer may have a molecular weight distribution (PDI; Mw/Mn), that is, a ratio (Mw/Mn) of a weight average molecular weight (Mw) to a number average molecular weight (Mn) in a range of 1.0 to 2.5. The lower limit of the molecular weight distribution of the block copolymer may be, for example, 1.0 or more, 1.1 or more, 1.2 or more, 1.3 or more, 1.4 or more, 1.5 or more, 1.6 or more, 1.7 or more, 1.8 or more, 1.9 or more, 2.0 or more, 2.2 or more, 2.3 or more, 2.4 or more, or 2.5 or more. The upper limit of the molecular weight distribution of the block copolymer may be, for example, 2.5 or less, 2.4 or less, 2.3 or less, 2.2 or less, 2.1 or less, 2.0 or less, 1.9 or less, 1.8 or less, or 1.7 or less.

By controlling the molecular weight characteristics as above, it is possible to form a pressure-sensitive adhesive that physical properties required in an optical film, such as interface adherence, endurance reliability, light leakage prevention property and re-workability, are kept excellent.

The block copolymer may be a cross-linkable copolymer having a cross-linkable functional group. The cross-linkable functional group may be exemplified by a hydroxy group, a carboxyl group, an isocyanate group or a glycidyl group, and the like. In one example, the cross-linkable functional group of the block copolymer may be a hydroxy group.

When the cross-linkable functional group is contained, the functional group may be contained in, for example, a block having a relatively low glass transition temperature, that is, the second block. In one example, the cross-linkable functional group may not be included in the first block, but may be included only in the second block. If the cross-linkable functional group is included in the second block, the appropriate cohesive force and stress relaxation property are exhibited depending on the temperature change and thus it is possible to form a pressure-sensitive adhesive that physical properties, such as interface adherence, endurance reliability, light leakage prevention property and re-workability, are kept excellent.

The block copolymer may comprise an aromatic group. The aromatic group may be exemplified by a benzyl group, a benzyloxy group, a phenyl group, a phenoxy group, a phenylthio group, a naphthyl group or a naphthyloxy group, and the like. In one example, the aromatic group of the block copolymer may be a benzyl group or a phenoxy group.

When the block copolymer contains an aromatic group, the aromatic group may be included in, for example, a block having a relatively low glass transition temperature, that is, a second block. In one example, the aromatic group may not be included in the first block, but may be included only in the second block. When the aromatic group is included in the second block, the pressure-sensitive adhesive can be formed in which the aromatic group is appropriately oriented in a certain direction and the light leakage prevention property is maintained excellent. Especially, when the pressure-sensitive adhesive is exposed to high temperature or high temperature and high humidity condition, optical compensation may be made by an aromatic group to reduce a light leakage phenomenon.

The kinds of the monomers forming the first block and the second block in the block copolymer can be appropriately selected so that the object of the present application can be achieved while ensuring the glass transition temperature as above by the combination of the respective monomers.

In one example, the first block may comprise a polymerized unit derived from a (meth)acrylic acid ester monomer. In this specification, the fact that a monomer is contained in a polymer or a block in a polymerized unit may mean that the monomer undergoes a polymerization reaction to form a skeleton of the polymer or block, for example, a main chain or a side chain. As the (meth)acrylic acid ester monomer, for example, alkyl (meth)acrylate may be used. In consideration of control of cohesive force, glass transition temperature and tackiness, or the like, the alkyl (meth)acrylate having an alkyl group of 1 to 20 carbon atoms, 1 to 16 carbon atoms, 1 to 12 carbon atoms, 1 to 8 carbon atoms, or 1 to 4 carbon atoms can be used. Here, the alkyl group may be linear, branched or cyclic. An example of such a monomer may include methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth) acrylate and lauryl (meth)acrylate, and the like, and one or two or more of the foregoing may be selected and used, so that the glass transition temperature is secured.

In one example, considering the interface adherence, endurance reliability and low light leakage characteristics of the pressure-sensitive adhesive, the first block may comprise a polymerized unit derived from an alky (meth)acrylate having an alkyl group of 1 to 3 carbon atoms as the first monomer and an alkyl (meth)acrylate having an alkyl group of 4 to 10 carbon atoms as the second monomer. According to one embodiment of the present application, the first monomer may be methyl methacrylate and the second monomer may be butyl methacrylate. In one example, the first block comprises a polymerized unit derived from 60 to 80 parts by weight of the first monomer and 20 to 40 parts by weight of the second monomer, more specifically 60 to 70 parts by weight of the first monomer and 30 to 40 parts by weight of the second monomer. In this specification, the unit part by weight may mean a weight ratio between the respective components. For example, as described above, the fact that the first block comprises the polymerized unit derived from 60 to 80 parts by weight of the first monomer and 20 to 40 parts by weight of the second monomer may mean the case where the ratio (A: B) based on the weight of the first monomer (A) and the second monomer (B) forming the polymerized unit of the first block is 60 to 80:20 to 40.

In one example, the second block may comprise a polymerized unit derived from a (meth)acrylic acid ester monomer, a copolymerizable monomer having a cross-linkable functional group and a copolymerizable monomer having an aromatic group.

In one example, the second block may comprise a polymerized unit derived from 20 to 98 parts by weight of a (meth)acrylic acid ester monomer, 1 to 40 parts by weight of a copolymerizable monomer having a cross-linkable functional group, and 1 to 40 parts by weight of a copolymerizable monomer having an aromatic group. When the content of the copolymerizable monomer having an aromatic group is in the above range, low light leakage characteristics can be exhibited while maintaining the balance of the pressure-sensitive adhesive property of the acrylic pressure-sensitive adhesive.

In one specific example, the second block may comprise a polymerized unit derived from 60 to 98 parts by weight of a (meth)acrylic acid ester monomer, 1 to 25 parts by weight of a copolymerizable monomer having a cross-linkable functional group, and 1 to 25 parts by weight of a copolymerizable monomer having an aromatic group. When the composition of the second block satisfies the above, it is possible to provide a pressure-sensitive adhesive capable of minimizing light leakage while ensuring physical properties such as interface adherence, endurance reliability and appropriate cohesive force.

In another example, the copolymerizable monomer having an aromatic group may be contained in a ratio of 1 to 25 parts by weight relative to 100 parts by weight of the second block. Specifically, the copolymerizable monomer having an aromatic group may be contained in a ratio of 5 to 25 parts by weight or a ratio of 10 to 20 parts by weight, relative to 100 parts by weight of the second block. When the content of the copolymerizable monomer having an aromatic group is in the above range, low light leakage characteristics can be exhibited while maintaining a balance of the pressure-sensitive adhesive property of the acrylic pressure-sensitive adhesive.

As the (meth)acrylic acid ester monomer forming the second block, a monomer of a kind capable of finally securing the glass transition temperature in the above-described range through copolymerization with the copolymerizable monomer can be selected and used among the monomers that can be contained in the first block. In consideration of control easiness of the glass transition temperature, or the like, as the (meth)acrylic acid ester monomer forming the second block, an acrylic acid ester monomer such as alkyl acrylate, for example, alkyl acrylate having an alkyl group of 1 to 20 carbon atoms, 1 to 16 carbon atoms, 1 to 12 carbon atoms, 1 to 8 carbon atoms or 1 to 4 carbon atoms can be used among the above-described monomers, although not particularly limited. According to one embodiment of the present invention, butyl acrylate may be used as the alkyl acrylate.

By using, for example, the monomer having a moiety capable of copolymerizing with other monomers contained in the block copolymer, such as the (meth)acrylic acid ester monomer and also having the above-described cross-linkable functional group, as the copolymerizable monomer having a cross-linkable functional group, the pressure-sensitive adhesive may exhibit appropriate cohesive force and stress relaxation property depending on the temperature change to form the pressure-sensitive adhesive having excellent endurance reliability, light leakage prevention characteristics, workability, or the like. In one example, as the copolymerizable monomer having a cross-linkable functional group, a copolymerizable monomer having a hydroxy group can be used.

In the field of pressure-sensitive adhesive production, various copolymerizable monomers having a cross-linkable functional group as above are known, and all of these monomers can be used for the polymer. For example, as the copolymerizable monomer having a hydroxy group, hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate, or hydroxyalkyleneglycol (meth)acrylate such as 2-hydroxypropyleneglycol (meth)acrylate, and the like can be used, without being limited thereto. In consideration of reactivity with other monomers forming the second block and control easiness of the glass transition temperature, and the like, hydroxyalkyl acrylate or hydroxyalkyleneglycol acrylated, and the like can be used among the above monomers, without being limited thereto.

As the copolymerizable monomer having an aromatic group, a (meth)acrylic monomer having an aromatic group can be used. In one example, as the copolymerizable monomer having an aromatic group, a compound represented by Formula 1 below can be used.

[Formula 1]

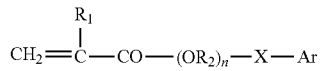

In the above formula, $R_1$ represents hydrogen or a methyl group, $R_2$ represents an alkylene group having 1 to 12 carbon atoms, n represents an integer of 0 to 3, preferably 0 or 1, X represents an oxygen atom or a sulfur atom, and Ar represents an aromatic group unsubstituted or substituted with halogen, especially bromine or chlorine, or alkyl having 1 to 12 carbon atoms.

In one specific example, the copolymerizable monomer having an aromatic group may be exemplified by phenoxyethyl (meth)acrylate, benzyl (meth)acrylate, 2-phenylthio-1-ethyl (meth)acrylate, 6-(4,6-dibromo-2-isopropylphenoxy)-1-hexyl (meth)acrylate, 6-(4,6-dibromo-2-sec-butylphenoxy)-1-hexyl (meth)acrylate, 2,6-dibromo-4-nonylphenyl (meth)acrylate, 2,6-dibromo-4-dodecylphenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate and 8-(2-naphthyloxy)-1-octyl (meth)acrylate, and the like, and typically, phenoxyethyl (meth)acrylate, benzyl (meth)acrylate, 2-phenylthio-1-ethyl acrylate, 8-(2-naphthyloxy)-1-octyl acrylate or 2-(1-naphthyloxy)-ethyl acrylate can be used, and more specifically, phenoxyethyl (meth)acrylate, benzyl (meth)acrylate, and the like can be used, without being limited thereto.

The first block and/or the second block may further comprise any other comonomer, if necessary, for example, if necessary, for controlling the glass transition temperature and the like, where the monomer may be included as the polymerized unit. The comonomer may include a nitrogen-containing monomer such as (meth)acrylonitrile, (meth)acrylamide, N-methyl (meth)acrylamide, N-butoxymethyl (meth)acrylamide, N-vinyl pyrrolidone or N-vinyl caprolactam; an alkylene oxide group-containing monomer such as an alkoxy alkyleneglycol (meth)acrylic acid ester, an alkoxy dialkyleneglycol (meth)acrylic acid ester, an alkoxy trialkyleneglycol (meth)acrylic acid ester, an alkoxy tetralkyleneglycol (meth)acrylic acid ester, an alkoxy polyethyleneglycol (meth)acrylic acid ester, a phenoxy alkyleneglycol (meth)acrylic acid ester, a phenoxy dialkyleneglycol (meth)acrylic acid esters, a phenoxy trialkyleneglycol (meth)acrylic acid ester, a phenoxy tetralkyleneglycol (meth)acrylic acid ester or a phenoxy polyalkylene glycol (meth)acrylic acid ester; a styrenic monomer such as styrene or methylstyrene; a glycidyl group-containing monomer such as glycidyl (meth)acrylate; or a carboxylic acid vinyl ester such as vinyl acetate, and the like, but is not limited thereto. These comonomers may be included in the polymer by selecting one or two or more of suitable types, if necessary. Such a comonomer may be included in the block copolymer, for example, in a ratio of 20 parts by weight or less, or 0.1 parts by weight to 15 parts by weight, relative to the weight of the other monomers in each block.

The block copolymer may comprise, for example, 5 to 50 parts by weight of the first block and 50 to 95 parts by weight of the second block. The weight ratio between the first block and the second block may be adjusted as above to provide the pressure-sensitive adhesive composition and the pressure-sensitive adhesive, having excellent physical properties. In another example, the block copolymer may comprise 10 to 50 parts by weight of the first block and 50 to 90 parts by weight of the second block, 10 to 40 parts by weight of the first block and 60 to 90 parts by weight of the second block, 10 to 30 parts by weight of the first block and 70 to 90 parts by weight of the second block or 10 to 20 parts by weight of the first block and 80 to 90 parts by weight of the second block.

In one example, the block copolymer may be a diblock copolymer comprising the first and second blocks, i.e. a block copolymer comprising only two blocks of the first and second blocks. By using the diblock copolymer, it is possible to excellently maintain the interface adherence, endurance reliability, stress relaxation property and re-workability of the pressure-sensitive adhesive.

The method for producing the block copolymer is not particularly limited and may be produced in a usual manner. The block polymer may be polymerized by, for example, an LRP (living radical polymerization) method, where the example thereof includes anion polymerization in which the polymer is synthesized in the presence of an inorganic acid salt such as an alkali metal or alkali earth metal by using an organic rare earth metal complex as a polymerization initiator or using an organic alkali metal compound as a polymerization initiator, an anionic polymerization method in which the polymer is synthesized in the presence of an organoaluminum compound by using an organic alkali metal compound as a polymerization initiator, an atomic transfer radical polymerization method (ATRP) using an atomic transfer radical polymerization agent as a polymerization controlling agent, an ARGET (activators regenerated by electron transfer) atomic transfer radical polymerization method (ATRP) using an atomic transfer radical polymerization agent as a polymerization controlling agent, but carrying out the polymerization under an organic or inorganic reducing agent that generates electrons, an ICAR (initiators for continuous activator regeneration) atomic transfer radical polymerization method (ATRP), a polymerization method (RAFT) by reversible addition-cleavage chain transfer using a reducing agent addition-cleavage chain transfer agent or a method using an organic tellurium compound as an initiator, and the like, and among these methods, an appropriate method can be selected and applied.

The pressure-sensitive adhesive composition may comprise a polyfunctional cross-linking agent capable of cross-linking the block copolymer. The cross-linking agent may react with the cross-linking point of the block copolymer, that is, the above-mentioned cross-linkable functional group to realize a cross-linked structure. As the cross-linking agent, a cross-linking agent having at least two functional groups capable of reacting with the cross-linkable functional group contained in the block copolymer may be used. Such a polyfunctional cross-linking agent may be exemplified by an isocyanate cross-linking agent, an epoxy cross-linking agent, an aziridine cross-linking agent or a metal chelate cross-linking agent, and the like. In one example, when the cross-linkable functional group is a hydroxy group, an isocyanate cross-linking agent may be used as the polyfunctional cross-linking agent.

As the isocyanate cross-linking agent, for example, a diisocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound obtained by reaction of the diisocyanate compound with a polyol can be used, where as the polyol, for example, trimethylol propane and the like can be used. In the pressure-sensitive adhesive composition, one or two or more cross-linking agents among the above examples may be used, but is not limited thereto.

The polyfunctional cross-linking agent may be contained in the pressure-sensitive adhesive composition in an amount of, for example, 0.01 to 10 parts by weight relative to 100 parts by weight of the block copolymer. The lower limit of the cross-linking agent content may be, for example, 0.05 parts by weight or more, 0.1 parts by weight or more, 0.15 parts by weight or more, 0.2 parts by weight or more, 0.25 parts by weight or more, 0.3 parts by weight or more, 1 part by weight or more, 2 parts by weight or more, 3 parts by weight or more, or 4 parts by weight or more. The upper limit of the cross-linking agent content may be, for example, 10 parts by weight or less, 8 parts by weight or less, 6 parts by weight or less, 4 parts by weight or less, 2 parts by weight or less, 1 part by weight or less, 0.75 parts by weight or less, or 0.5 parts by weight or less. In this range, the cross-linking degree of the block copolymer can be appropriately controlled, whereby various physical properties such as gel fraction, cohesive force, pressure-sensitive adhesive force, low light leakage property, endurance reliability and interface adhesiveness of the pressure-sensitive adhesive can be excellently maintained.

The pressure-sensitive adhesive composition may further comprise a silane coupling agent. As the silane coupling agent, for example, a silane coupling agent having a beta-cyano group or an acetoacetyl group can be used. Such a silane coupling agent can make, for example, a pressure-sensitive adhesive formed by a copolymer having a low molecular weight exhibit excellent adherence and adhesive stability, and can also maintain excellent endurance reliability under heat resistant and moist-heat resistant conditions.

As the silane coupling agent having a beta-cyano group or an acetoacetyl group, for example, a compound represented by Formula 2 or 3 below can be used.

$$(R_1)_n Si(R_2)_{(4-n)} \qquad \text{[Formula 2]}$$

$$(R_3)_n Si(R_2)_{(4-n)} \qquad \text{[Formula 3]}$$

In Formula 2 or 3 above, $R_1$ is a beta-cyanoacetyl group or a beta-cyanoacetylalkyl group, $R_3$ is an acetoacetyl group or an acetoacetylalkyl group, $R_2$ is an alkoxy group, and n is a number of 1 to 3.

In Formula 2 or 3, the alkyl group may be an alkyl group having 1 to 20 carbon atoms, 1 to 16 carbon atoms, 1 to 12 carbon atoms, 1 to 8 carbon atoms or 1 to 4 carbon atoms, and such an alkyl group may be linear, branched or cyclic.

Also, in Formula 2 or 3, the alkoxy group may be an alkoxy group having 1 to 20 carbon atoms, 1 to 16 carbon atoms, 1 to 12 carbon atoms, 1 to 8 carbon atoms or 1 to 4 carbon atoms, and such an alkoxy group may be linear, branched or cyclic.

Furthermore, in Formula 2 or 3, n may be, for example, 1 to 3, 1 to 2, or 1.

The compound of Formula 2 or 3 can be exemplified by, for example, acetoacetylpropyl trimethoxysilane, acetoacetylpropyl triethoxysilane, beta-cyanoacetylpropyl trimethoxysilane or beta-cyanoacetylpropyl triethoxysilane, and the like, but is not limited thereto.

In the pressure-sensitive adhesive composition, the silane coupling agent may be contained in an amount of 0.01 to 5 parts by weight or 0.01 to 1 part by weight relative to 100 parts by weight of the block copolymer, and within this range, the desired physical properties may be effectively imparted to the pressure-sensitive adhesive.

Also, the pressure-sensitive adhesive composition may further comprise a tackifier, if necessary. As the tackifier, for example, one or a mixture of two or more of a hydrocarbon resin or hydrogenated product thereof, a rosin resin or hydrogenated product thereof, a rosin ester resin or hydrogenated product thereof, a terpene resin or hydrogenated product thereof, a terpene phenol resin or hydrogenated product thereof, a polymerized rosin resin or a polymerized rosin ester resin, and the like, may be used, but is not limited thereto. The tackifier may be included in the pressure-sensitive adhesive composition in an amount of 100 parts by weight or less relative to 100 parts by weight of the block copolymer.

The pressure-sensitive adhesive composition may further comprise, if necessary, at least one additive selected from the group consisting of known additives, for example, a coordinating compound capable of forming a coordination bond with the antistatic agent, an epoxy resin, a curing agent, a ultraviolet stabilizer, an antioxidant, a toning agent, a reinforcing agent, a filler, a defoaming agent, a surfactant and a plasticizer.

The present application also relates to a use of the pressure-sensitive adhesive composition.

The pressure-sensitive adhesive composition may be a pressure-sensitive adhesive composition for a protective film. The protective film can be used, for example, for protecting the surface of various optical films.

The pressure-sensitive adhesive composition may be a pressure-sensitive adhesive composition for an optical film. For example, the pressure-sensitive adhesive composition for an optical film can be used as a use for laminating optical films such as a polarizing film, a retardation film, an antiglare film, a wide viewing angle compensation film or a luminance enhancement film to each other, or attaching the optical film or laminate thereof to an adherend. In one example, the pressure-sensitive adhesive composition may be a pressure-sensitive adhesive composition used as a use for attaching a polarizing film to a liquid crystal panel as a pressure-sensitive adhesive composition for a polarizing plate.

In one example, the present application relates to a pressure-sensitive adhesive optical laminate. An exemplary optical laminate may comprise an optical film; and a pressure-sensitive adhesive layer present on one or both sides of the optical film. The pressure-sensitive adhesive layer may be, for example, a pressure-sensitive adhesive layer for attaching the optical film to a liquid crystal panel or the like of an LCD device or other optical films. Also, the pressure-sensitive adhesive layer may comprise the pressure-sensitive adhesive composition of the present invention as described above. The pressure-sensitive adhesive composition may be contained in the pressure-sensitive adhesive layer in a state of realizing a cross-linked structure. Here, the optical film may be exemplified by a polarizing plate, a polarizer, a retardation film or a luminance enhancement film, and the like, or a laminate in which two or more of the foregoing are laminated. In this specification, the term polarizing plate and polarizer designate objects that are distinguished from each other. That is, the polarizer designates a film, sheet or element itself exhibiting a polarization function, and the polarizing plate means an optical element comprising other components together with the polarizer. Other elements that can be included in the optical element together with the polarizer can be exemplified by a polarizer protective film or a retardation layer, and the like, but is not limited thereto.

The present application also relates to a pressure-sensitive adhesive polarizing plate. The polarizing plate may have, for example, a structure in which the optical film is a polarizer in the pressure-sensitive adhesive optical laminate.

The type of the polarizer included in the polarizing plate is not particularly limited, and for example, general types known in the art, such as a polyvinyl alcohol-based polarizer, can be adopted without limitation.

A polarizer is a functional film capable of extracting only light oscillating in one direction from light incident while oscillating in various directions. Such a polarizer may be, for example, a form in which a dichroic dye is adsorbed and oriented on a polyvinyl alcohol-based resin film. The polyvinyl alcohol-based resin constituting the polarizer can be obtained by, for example, performing gelation of a polyvinyl acetate-based resin. In this case, the usable polyvinyl acetate-based resin may include not only homopolymers of vinyl acetate but also copolymers of vinyl acetate and other monomers copolymerizable therewith. Here, an example of the monomer copolymerizable with vinyl acetate may include one or a mixture of two or more of unsaturated carboxylic acids, olefins, vinyl ethers, unsaturated sulfonic acids, and acrylamides having an ammonium group, but is not limited thereto. The polyvinyl alcohol-based resin may have a gelation degree of, typically, about 85 mol % to 100 mol %, preferably, 98 mol % or more. The polyvinyl alcohol-based resin may also be further modified, and for example, polyvinyl formal or polyvinyl acetal modified into aldehydes, and the like may also be used. The polyvinyl alcohol-based resin may have a polymerization degree of, typically, 1,000 to 10,000 or so, or 1,500 to 5,000 or so.

The polarizer may be produced through a process of stretching the above polyvinyl alcohol-based resin film (e.g., uniaxially stretching), a process of dyeing the polyvinyl alcohol-based resin film with a dichroic dye and adsorbing the dichroic dye, a process of treating the polyvinyl alcohol-based resin film adsorbed by the dichroic dye with a boric acid aqueous solution and a process of washing after treating with the boric acid aqueous solution, and the like. Here, as the dichroic dye, iodine or a dichroic organic dye, and the like may be used.

Also, the polarizing plate may further comprise a protective film attached to one or both sides of the polarizer, and in this case, the pressure-sensitive adhesive layer may be formed on one or both sides of the protective film. In one example, the pressure-sensitive adhesive layer may be formed on the side opposite to the polarizer of the protective film. The kind of the protective film is not particularly limited, and for example, a film having a laminated structure of one or two or more layers, such as a cellulose-based film such as TAC (triacetyl cellulose); a polyester-based film such as a polycarbonate film or PET (poly(ethylene terephthalate)); a polyether sulfone-based film; or a polyethylene film, a polypropylene film or a polyolefin-based film produced by using a resin having a cyclo or norbornene structure, or an ethylene-propylene copolymer, and the like can be used Furthermore, the polarizing plate may further comprise at least one functional layer selected from the group consisting of a protective layer, a reflective layer, an antiglare layer, a retardation film, a wide view angle compensation film and a luminance enhancement film.

In the present application, the method of forming the pressure-sensitive adhesive layer on the polarizing plate or the optical film is not particularly limited, and for example, a method of directly coating the pressure-sensitive adhesive composition and curing it to realize a cross-linked structure can be used, or a method in which the pressure-sensitive adhesive composition is coated and cured on the release-treated surface of a release film to form a cross-linked structure and then transferred, and the like can be used.

The method of coating the pressure-sensitive adhesive composition is not particularly limited, and for example, a method of applying the pressure-sensitive adhesive composition by a common means such as a bar coater is used.

In the coating process, the cross-linking agent contained in the pressure-sensitive adhesive composition is preferably controlled from the viewpoint of performing a uniform coating process so that the cross-linking reaction of the functional groups does not proceed, whereby the cross-linking agent may form a cross-linked structure in the curing and aging process after the coating operation to improve the cohesive force of the pressure-sensitive adhesive and to improve the pressure-sensitive adhesive physical properties and cuttability.

The coating process is also preferably performed after sufficiently removing the bubble-inducing component such as the volatile component or the reaction residue in the pressure-sensitive adhesive composition and accordingly, it is possible to prevent problems that the cross-linking density or molecular weight of the pressure-sensitive adhesive is too low to lower the elastic modulus, and bubbles existing between the glass plate and the pressure-sensitive adhesive layer at a high temperature state are enlarged to form scattering bodies therein, and the like.

The method of curing the pressure-sensitive adhesive composition to realize a cross-linked structure is also not particularly limited, and for example, a method of maintaining the coating layer at an appropriate temperature so that a cross-linking reaction between the block copolymer and the polyfunctional cross-linking agent contained in the coating layer can be induced.

The present application also relates to a display device, for example, an LCD device. It may comprise the above-mentioned exemplary optical laminate or polarizing plate. When the display device is an LCD, the device may comprise a liquid crystal panel and the polarizing plate or optical laminate attached to one or both sides of the liquid crystal panel. The polarizing plate or optical laminate may be attached to the liquid crystal panel by the above-described pressure-sensitive adhesive.

The liquid crystal panel may comprise, for example, a first substrate, a pixel electrode, a first alignment film, a liquid crystal layer, a second alignment film, a common electrode, and a second substrate, which are sequentially formed. In one example, the first substrate and the second substrate may be glass substrates. In this case, the polarizing plate or optical laminate may be attached to the glass substrate via the above-described pressure-sensitive adhesive layer.

The device may further comprise a light source on the opposite side of the viewing side of the liquid crystal panel. In the first substrate on the light source side, for example, an active driving circuit comprising TFTs (thin film transistors) as a driving element electrically connected to the transparent pixel electrode and wiring, and the like may be formed. The pixel electrode comprises, for example, ITO (indium tin oxide) or the like, and can function as an electrode for each pixel. In addition, the first or second alignment film may comprise, for example, a material such as polyimide, but is not limited thereto.

As the liquid crystal panel in the device, for example, all the known panels of a passive matrix mode panel such as a TN (twisted nematic) type, an STN (super twisted nematic) type, an F (ferroelectic) type or a PD (polymer dispersed) type; an active matrix mode panel such as a two-terminal or a three-terminal type; a transverse electric field type (IPS: in plane switching) panel and a vertical alignment type (VA) panel, and the like may be applied.

Types of other configurations of the display device, for example, upper and lower substrates such as a color filter substrate or an array substrate in a liquid crystal display device, and the like are not particularly limited, and configurations known in this field can be adopted without limitation.

Advantageous Effects

In the present application, a pressure-sensitive adhesive composition having all excellent physical properties such as endurance reliability and interface adhesiveness and being capable of minimizing light leakage occurring under high temperature and/or high humidity conditions can be provided. The pressure-sensitive adhesive composition of the present application can be used for an optical film such as a protective film and a polarizing plate.

MODE FOR INVENTION

Hereinafter, the pressure-sensitive adhesive composition will be described in detail by way of examples and comparative examples, but the scope of the pressure-sensitive adhesive composition is not limited by the following examples.

The physical properties of these examples and comparative examples were evaluated in the following manner.

1. Evaluation of Molecular Weight Characteristics

The number average molecular weight (Mn) and the molecular weight distribution (PDI) were measured using GPC (gel permeation chromatograph), and the GPC measurement conditions are as follows. The measurement results were converted using standard polystyrene (manufactured by Aglient system) for preparing the calibration curve.

<GPC measurement conditions>
Measuring instrument r: Aglient GPC (Aglient 1200 series, U.S.)
Column: Two PL Mixed B connected
Column temperature: 40° C.
Eluent: THF (tetrahydrofuran)
Flow rate: 1.0 mL/min
Concentration: ~1 mg/mL (100 μl injection)

2. TAC Interface Adhesiveness Evaluation

Sample preparation and measurement method (1) A PET (poly(ethylene terephthalate)) film was tailored to a size of 2.5×20 cm and corona-treated.

(2) The polarizing plates prepared in Examples and Comparative Examples were each tailored to 2.5×10 cm within 1 hour, and then the polarizing plate was attached to the corona-treated PET film via the pressure-sensitive adhesive layer. Half of the corona-treated PET film is attached to the pressure-sensitive adhesive layer of the polarizing plate as shown in FIG. 1.

(3) A double-sided tape is attached to a glass substrate and then the polarizing plate portion of the sample illustrated in FIG. 1 is attached thereto.

The interface adhesiveness was evaluated 5 days after preparing the sample. The interface adhesiveness was evaluated by pulling the PET film portion without the attached polarizing plate to measure the peel force. The peel force (dyne/25 mm) was measured at room temperature under conditions of a peel rate of 300 mm/min and a peel angle of 180 degrees, and when the peel force was 3000 gf or more, it was determined for the interface adhesiveness to be excellent.

3. Evaluation of Durability

The polarizing plates prepared in Examples and Comparative Examples are each tailored to have a width of 180 mm and a height of 320 mm, and attached to a 19-inch commercial liquid crystal panel. Thereafter, the panel with the attached polarizing plate is stored for about 20 minutes in an autoclave (50° C., 5 atm) to prepare a sample. The moist-heat resistant durability was evaluated according to the following criteria by observing occurrence of bubbles and peeling at the pressure-sensitive adhesive interface after leaving the sample to stand at 60° C. and 90% relative humidity for 500 hours, and the heat resistant durability was evaluated according to the following criteria by also observing occurrence of bubbles and peeling after maintaining the sample at 80° C. for 500 hours.
<Evaluation Criteria>
A: no bubbles and peeling occurred
B: slight bubbles and/or peeling occurred
C: large amount of bubbles and/or peeling occurred

4. Light Leakage Evaluation

Figure 2:
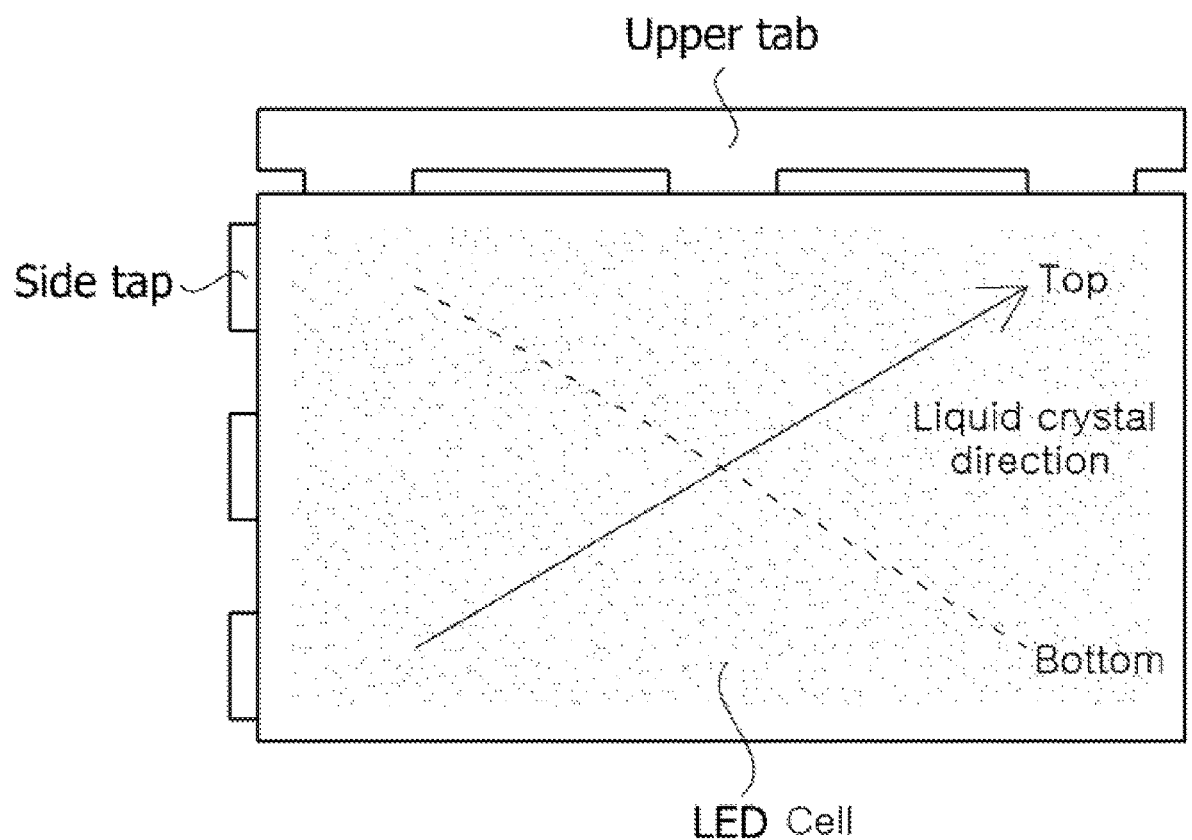
FIG. 2 illustrates a method of attaching a polarizing plate.

In order to investigate uniformity of light transmittance, it was observed using a backlight whether there was a light leakage portion in the dark room.
Panel type: LCD module for TN
Specimen: 2 polarizing plates to which the pressure-sensitive adhesive fitting LCD module size is attached
Polarizing plate check: polarizing plate tailored in the 45 degree direction with respect to the stretching direction
Wide view liquid crystal direction check of polarizing plate: The long side of the polarizing plate is held with both hands and shone vertically on the LCD monitor so that light is not transmitted, and then the long side of the polarizing plate is bent toward the body to check which of the left and right the light leaks, where if the light leaking direction is to the right, the down right direction is the liquid crystal direction.
(1) The LCD module is disassembled, the polarizing plate attached to the LCD cell is removed and the cell surface is wiped with EAc.
(2) After checking the wide view liquid crystal coating direction of the polarizing plate, the polarizing plate is attached so that the liquid crystal direction faces away from the side tap, as shown in FIG. 2. Two upper and lower specimens are attached to both sides of the cell in the state that the polarized light is crossed, and the direction is aligned so that the top and bottom of the liquid crystal direction cross.
(3) The cell is stored for 72 hours under aging conditions (moist-heat resistant condition: a temperature of 60° C. and 90% relative humidity, heat resistant condition: a temperature of 70° C.), and then left to stand at room temperature for 2 hours to observe the light leakage.

Method of observing light leakage: it was evaluated according to the following criteria by observing the LCD module with the naked eye while driving it.
<Evaluation Criteria>
A: it is difficult to determine the light leakage with the naked eye.
B: slight light leakage
C: some light leakage
D: large amount of light leakage

5. Estimation of Glass Transition Temperature

The glass transition temperature (Tg) of a block copolymer or each block of the block copolymer was calculated according to Equation A below.

$$1/Tg = \Sigma W_n/T_n \qquad \text{<Equation A>}$$

In Equation above, $W_n$ is a weight fraction of the monomer applied to a block copolymer or each block of the block copolymer, and $T_n$ represents a glass transition temperature when each of the corresponding monomers has formed a homopolymer. That is, in Equation A, the right side is a result of summing up the calculated values after calculating all the values ($W_n/T_n$) obtained by dividing the weight fraction of the used monomer by the glass transition temperature appearing when the monomer has formed the homopolymer for each monomer.

Preparation Example 1. Preparation of Block Copolymer (A1)

11.4 g of methyl methacrylate (MMA), 2.9 g of butyl methacrylate (BMA) and 0.032 g of EBiB (ethyl 2-bromoisobutyrate) as monomers forming the first block were mixed in 6.1 g of ethyl acetate (EAc). The reactor containing the mixture was sealed, purged with nitrogen and stirred at about 25° C. for about 30 minutes, and dissolved oxygen was removed through bubbling. Thereafter, 0.002 g of $CuBr_2$, 0.006 g of TPMA (tris(2-pyridylmethyl)amine) and 0.003 g of V-65 (2,2'-azobis (2,4-dimethyl valeronitrile)) were introduced to the mixture in which oxygen was removed and the mixture was immersed in a reaction tank at about 67° C. to initiate the reaction (polymerization of the first block).

When the conversion of methyl methacrylate was about 70%, the mixture forming the second block which had been previously bubbled with nitrogen was introduced thereto in the presence of nitrogen. The mixture forming the second block was prepared by dissolving 109.7 g of butyl acrylate (BA), 1.1 g of hydroxybutyl acrylate (HBA) and 1.7 g of benzyl acrylate (BzA) as a monomer mixture in 75 g of ethyl acetate (EAc) as a solvent. Then, 0.004 g of $CuBr_2$, 0.001 g of TPMA and 0.01 g of V-65 were added to the reactor, and a chain extension reaction was carried out (polymerization of the second block). If the conversion of the monomer (BA) reached 80% or more, the reaction mixture was exposed to oxygen and diluted with an appropriate solvent to terminate the reaction, thereby preparing the block copolymer (in the above process, V-65 was appropriately divided and introduced until the end of the reaction in consideration of its half-life).

Preparation Examples 2 to 9. Preparation of Block Copolymers (A2 to A7 and B2)

The block copolymers were prepared in the same manner as in Preparation Example 1, except that the raw materials used in the polymerization of the first block and the second block were controlled as in Table 1 below.

TABLE 1

|  |  | Block copolymer | | | | | | | | |
|---|---|---|---|---|---|---|---|---|---|---|
|  |  | A1 | A2 | A3 | A4 | A5 | A6 | A7 | B1 | B2 |
| First block | MMA | 80 | 70 | 60 | 80 | 70 | 60 | 80 | 70 | 0 |
|  | BMA | 20 | 30 | 40 | 20 | 30 | 40 | 20 | 30 | 0 |
|  | Styrene | 0 | 0 | 0 | 0 | 0 | 0 | 0 | 0 | 100 |
|  | Tg (° C.) | 90 | 80 | 72 | 90 | 80 | 72 | 90 | 80 | 125 |
|  | Mn (x10000) | 2.3 | 2.7 | 2.9 | 2.3 | 2.7 | 2.9 | 2.3 | 2.7 | 2.5 |
|  | PDI | 1.34 | 1.36 | 1.38 | 1.34 | 1.36 | 1.38 | 1.34 | 1.36 | 1.31 |
| Second block | BA | 97.5 | 89 | 79 | 97.5 | 89 | 79 | 85 | 99 | 99 |
|  | HBA | 1 | 1 | 1 | 1 | 1 | 1 | 5 | 1 | 1 |
|  | BzA | 1.5 | 10 | 20 | 0 | 0 | 0 | 10 | 0 | 0 |
|  | PEA | 0 | 0 | 0 | 1.5 | 10 | 20 | 0 | 0 | 0 |
|  | Tg (° C.) | −45 | −49.1 | −47.0 | −45.0 | −49.1 | −47.0 | −49.7 | −45.0 | −45.0 |
| Block copolymer | Mn (x10000) | 12.3 | 15.6 | 17.8 | 12.2 | 15.7 | 18.0 | 12.4 | 15.4 | 15.4 |
|  | PDI | 1.8 | 2.3 | 2.4 | 1.9 | 2.2 | 2.5 | 1.8 | 2.5 | 2.6 |

Content unit: part by weight, BA: butyl acrylate (homopolymer Tg: about −45° C.), HBA: 4-hydroxybutyl acrylate (homopolymer Tg: about −80° C.), MMA: methyl methacrylate (homopolymer Tg: about 110° C.), BMA: butyl methacrylate(homopolymer Tg: about 27° C.), BzA: benzyl acrylate (homopolymer Tg: about 6° C.), PEA: phenoxy ethyl acrylate (homopolymer Tg: about 5° C.), Styrene (homopolymer Tg: about 125° C.), Tg: glass transition temperature, Mn: number average molecular weight, PDI: molecular weight distribution

Preparation Example 10. Preparation of Random Copolymer (B3)

A monomer mixture comprised of 69 parts by weight of n-butylacrylate (BA), 1.0 part by weight of hydroxybutyl acrylate and 30 parts by weight of benzyl acrylate was introduced into a 1 L reactor refluxed by nitrogen gas and equipped with a cooling device for easy temperature control. Subsequently, 150 parts by weight of ethyl acetate (EAc) was introduced thereto as a solvent. Nitrogen gas was purged for about 60 minutes to remove oxygen, and then 0.03 parts by weight of AIBN (azobisisobutyronitrile) as a reaction initiator was introduced thereto while maintaining the temperature at 60° C. and reacted for about 8 hours to prepare a random copolymer (B3). The prepared random copolymer (B2) had a weight average molecular weight of 1200,000 and a molecular weight distribution (PDI) of 4.9.

Preparation Example 11. Preparation of Random Copolymer (B4)

A monomer mixture comprised of 99 parts by weight of n-butylacrylate (BA) and 1.0 part by weight of hydroxybutyl acrylate was introduced into a 1 L reactor refluxed by nitrogen gas and equipped with a cooling device for easy temperature control. Subsequently, 150 parts by weight of ethyl acetate (EAc) was introduced thereto as a solvent. Nitrogen gas was purged for about 60 minutes to remove oxygen, and then 0.03 parts by weight of AIBN (azobisisobutyronitrile) as a reaction initiator was introduced thereto while maintaining the temperature at 60° C. and reacted for about 8 hours to prepare a random copolymer (B3). The prepared random copolymer (B4) had a weight average molecular weight of 1200,000 and a molecular weight distribution (PDI) of 5.1.

Preparation Example 12. Preparation of Random Copolymer (B5)

To a 1 L reactor refluxed by nitrogen gas and equipped with a cooling device for easy temperature control, 94.0 parts by weight of n-butylacrylate (BA), 1 part by weight of hydroxyethyl acrylate and 5.0 parts by weight of a styrene macromonomer (molecular weight: about 10,000) having a vinyl group at the terminal were introduced. Subsequently, 150 parts by weight of ethyl acetate (EAc) was introduced thereto as a solvent. Nitrogen gas was purged for about 60 minutes to remove oxygen, and then 0.03 parts by weight of AIBN (azobisisobutyronitrile) as a reaction initiator was introduced thereto while maintaining the temperature at 60° C. and the polymerization reaction was continued for 48 hours, and after completion of the reaction, the reactant was precipitated with methanol and filtered to prepare a random copolymer (B5). The prepared random copolymer (B4) had a weight average molecular weight of 350000 and a molecular weight distribution (PDI) of 2.5.

Preparation Example 13: Preparation of Block Copolymer (B6)

A block copolymer (B6) was prepared in the same manner as in Preparation Example 2, except that styrene was used instead of BzA in the raw materials used in the polymerization of the second block. The prepared random copolymer (B6) had a number average molecular weight of 160,000 and a molecular weight distribution (PDI) of 2.5.

Example 1

Preparation of Coating Liquid (Pressure-Sensitive Adhesive Composition)

0.07 parts by weight of a cross-linking agent (Coronate L, manufactured by Japan NPU), 0.1 parts by weight of DBTDL (dibutyltin dilaurate) and 0.2 parts by weight of a silane coupling agent having a beta-cyanoacetyl group, relative to 100 parts by weight of the block copolymer (A1) prepared in Preparation Example 1, were mixed and ethyl acetate as a solvent was blended and controlled so as to have a coating solid content of about 30 wt % to prepare a coating liquid (pressure-sensitive adhesive composition).

Production of Pressure-Sensitive Adhesive Polarizing Plate

The prepared coating liquid was coated on the release-treated surface of a release PET (poly(ethylene terephthalate)) (MRF-38, manufactured by Mitsubishi) having a thickness of 38 μm and subjected to release treatment, so as to have a thickness after drying of about 23 μm, and maintained in an oven at 100° C. for about 3 minutes. After drying, the coating formed on the release PET was laminated on a WV (wide view) liquid crystal layer of a polarizing plate (TAC/PVA/TAC laminated structure: TAC=triacetyl cellulose, PVA=polyvinyl alcohol-based polarizing film) having a WV liquid crystal layer coated on one side to produce a pressure-sensitive adhesive polarizing plate.

Examples 2 to 7 and Comparative Examples 1 to 6

A pressure-sensitive adhesive composition (coating liquid) and a pressure-sensitive adhesive polarizing plate were prepared in the same manner as in Example 1, except that upon preparing the pressure-sensitive adhesive composition (coating liquid), components and ratios were each adjusted as in Table 2 below.

TABLE 2

| | | Example | | | | | | | Comparative Example | | | | | |
|---|---|---|---|---|---|---|---|---|---|---|---|---|---|---|
| | | 1 | 2 | 3 | 4 | 5 | 6 | 7 | 1 | 2 | 3 | 4 | 5 | 6 |
| Acrylic polymer | Type | A1 | A2 | A3 | A4 | A5 | A6 | A7 | B1 | B2 | B3 | B4 | B5 | B6 |
| | Content | 100 | 100 | 100 | 100 | 100 | 100 | 100 | 100 | 100 | 100 | 100 | 100 | 100 |
| Cross-linking agent | | 0.07 | 0.07 | 0.07 | 0.07 | 0.07 | 0.07 | 0.3 | 0.07 | 0.07 | 0.07 | 0.07 | 0.3 | 0.07 |
| DBTDL | | 0.1 | 0.1 | 0.1 | 0.1 | 0.1 | 0.1 | 0.1 | 0.1 | 0.1 | 0.1 | 0.1 | 0.1 | 0.1 |
| SCA | | 0.2 | 0.2 | 0.2 | 0.2 | 0.2 | 0.2 | 0.2 | 0.2 | 0.2 | 0.2 | 0.2 | 0.2 | 0.2 |

Content unit: part by weight, Cross-linking agent: Coronate L, manufactured by Japan NPU, DBTDL: dibutyltin dilaurate, SCA: a silane coupling agent having a beta-cyanoacetyl group (M812, manufactured by LG Chem)

The evaluation results of physical properties of Examples and Comparative Examples are shown in Table 3 below.

TABLE 3

| | Example | | | | | | | Comparative Example | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Light leakage (heat resistant) | B | A | A | B | A | A | A | C | C | C | D | C | C |
| Light leakage (moist-heat resistant) | B | A | A | B | A | A | A | C | C | C | D | C | C |
| Heat resistant durability | A | A | A | A | A | A | A | A | B | B | C | B | B |
| Moist-heat resistant durability | A | A | A | A | A | A | A | A | B | B | C | B | B |
| Interface peel force | 3800 | 3660 | 3450 | 3780 | 3510 | 3300 | 3580 | 3390 | 1410 | 1320 | 1500 | 1200 | 1470 |

The invention claimed is:

1. A pressure-sensitive adhesive composition comprising a block copolymer having a first block having a glass transition temperature of 50° C. or higher and a second block having a glass transition temperature of −10° C. or lower, wherein the second block comprises a cross-linkable functional group and an aromatic group derived from a copolymerizable monomer having an aromatic group represented by Formula 1 below:

[Formula 1]

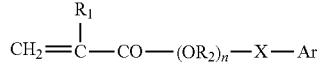

wherein, $R_1$ represents hydrogen or a methyl group, $R_2$ represents an alkylene group having 1 to 12 carbon atoms, n represents an integer of 0 to 3, X represents an oxygen atom or a sulfur atom, and Ar represents an aromatic group unsubstituted or substituted with halogen or alkyl having 1 to 12 carbon atoms, wherein the aromatic group is not contained in the first block, but is contained only in the second block, wherein the second block comprises a polymerized unit derived from 20 parts by weight to 98 parts by weight of a (meth)acrylic acid ester monomer, 1 part by weight to 40 parts by weight of a copolymerizable monomer having the cross-linkable functional group, and 1 part by weight to 40 parts by weight of a copolymerizable monomer having the aromatic group, and wherein the copolymerizable monomer having the aromatic group is contained in a ratio of 1 to 25 parts by weight relative to 100 parts by weight of the second block.

2. The pressure-sensitive adhesive composition according to claim 1, wherein the first block has a number average molecular weight of 2,500 to 150,000.

3. The pressure-sensitive adhesive composition according to claim 1, wherein the block copolymer has a molecular weight distribution (Mw/Mn) in a range of 1.0 to 2.5.

4. The pressure-sensitive adhesive composition according to claim 1, wherein the block copolymer has a number average molecular weight in a range of 50,000 to 300,000.

5. The pressure-sensitive adhesive composition according to claim 1, wherein the first block comprises a polymerized unit derived from a (meth)acrylic acid ester monomer.

6. The pressure-sensitive adhesive composition according to claim 1, wherein the cross-linkable functional group is a hydroxy group.

7. The pressure-sensitive adhesive composition according to claim 1, wherein the aromatic group is a benzyl group, a benzyloxy group, a phenyl group, a phenoxy group, a phenylthio group, a naphthyl group or a naphthyloxy group.

8. The pressure-sensitive adhesive composition according to claim 1, wherein the block copolymer is a diblock copolymer comprising 5 parts by weight to 50 parts by weight of the first block and 50 parts by weight to 95 parts by weight of the second block.

9. The pressure-sensitive adhesive composition according to claim 1, further comprising 0.01 parts by weight to 10 parts by weight of a polyfunctional cross-linking agent relative to 100 parts by weight of the block copolymer.

10. A pressure-sensitive adhesive polarizing plate having a polarizing plate and a pressure-sensitive adhesive layer which is present on one or both sides of said polarizing plate and comprises the pressure-sensitive adhesive composition of claim 1.

11. A display device comprising a liquid crystal panel and the pressure-sensitive adhesive polarizing plate of claim 10 attached to one or both sides of the liquid crystal panel.

* * * * *